United States Patent [19]

Nardone et al.

[11] Patent Number: 5,015,116

[45] Date of Patent: May 14, 1991

[54] STRUCTURAL JOINTS OF HIGH DIMENSIONAL STABILITY

[75] Inventors: Vincent C. Nardone; James R. Strife, both of South Windsor; Karl M. Prewo, Vernon, all of Conn.

[73] Assignee: United Technologies Corporation, Hartford, Conn.

[21] Appl. No.: 485,184

[22] Filed: Feb. 26, 1990

Related U.S. Application Data

[63] Continuation-in-part of Ser. No. 234,647, Aug. 22, 1988, abandoned.

[51] Int. Cl.$^5$ .............................. F16B 1/00; F16C 9/00
[52] U.S. Cl. ...................................... 403/28; 403/205; 403/310; 403/174
[58] Field of Search .................. 403/28, 29, 30, 205, 403/310, 174, 178, 218; 285/911, 373, 419, 156

[56] References Cited

U.S. PATENT DOCUMENTS

| | | | |
|---|---|---|---|
| 3,088,758 | 5/1963 | Chilton | 403/28 X |
| 4,314,852 | 2/1982 | Brennan et al. | 501/88 |
| 4,428,763 | 1/1984 | Layden | 65/4.21 |
| 4,464,192 | 8/1984 | Layden | 65/3.2 X |
| 4,667,505 | 5/1987 | Sharp | 285/373 X |

FOREIGN PATENT DOCUMENTS

795549 1/1936 France .................................. 403/310

Primary Examiner—Andrew V. Kundrat
Attorney, Agent, or Firm—Charles E. Sohl

[57] ABSTRACT

A dimensionally stable structural joint particularly suited for use in space systems. The joint comprises a connector having at least two tubular sleeves, at least two tubular members, and at least two annular clamping means for securing the tubular members inside the connector. The connector comprises at least two elements, manufactured from a fiber reinforced composite, which, when mated, form the connector. The tubular members are manufactured from a material having a coefficient of axial expansion of substantially zero. The annular clamping means are manufactured from a material having substantially the same coefficient of radial expansion as the tubular members. The combination of the connector comprises at least two elements and the annular clamping means with substantially the same coefficient of radial expansion as the tubular members allows the joint to accommodate radial expansion and contraction while maintaining axial dimensional stability.

11 Claims, 1 Drawing Sheet

U.S. Patent
May 14, 1991
5,015,116
FIG. 1
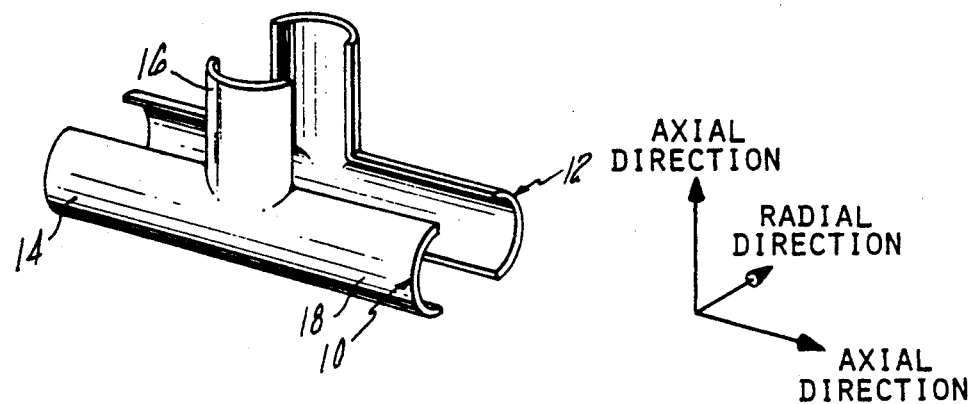
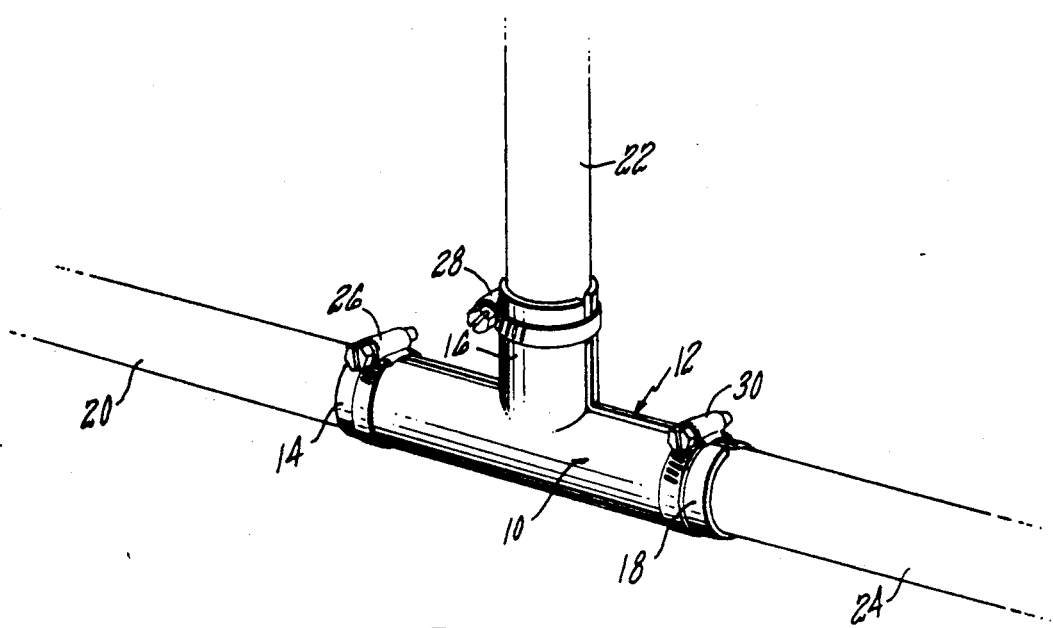
FIG. 2

STRUCTURAL JOINTS OF HIGH DIMENSIONAL STABILITY

This application is a continuation in part of application Ser. No. 07/234,467 filed Aug. 22, 1988, and now abandoned.

TECHNICAL FIELD

This invention relates generally to structural joints and more specifically to structural joints for satellite systems.

BACKGROUND ART

A considerable amount of effort has been expended in the development of dimensionally stable materials suitable for use in manufacturing support structures for satellite systems. Such dimensionally stable support structures are required to maintain the ultraprecise dimensions of optical components and other equipment mounted on satellites. The key to constructing dimensionally stable support structures is the manufacturing of dimensionally stable joints which comprise structural members, most likely in the form of long tubes, and connectors used to join the structural members together. In order to achieve the desired dimensional stability in the joint, the materials used to manufacture the structural members and connectors should have a coefficient of axial expansion of substantially zero over the temperature range of −250° F. to 250° F. which is typically encountered in the space environment.

Continuous carbon fiber reinforced metals, particularly graphite/aluminum and graphite/magnesium, meet the stringent axial dimensional stability requirements for use as structural members in satellite systems. However, these graphite fiber reinforced metals cannot readily be manufactured into complex shapes which display the axial stability required for connectors because of difficulties in controlling graphite fiber volume and fiber orientation. Therefore, materials other than graphite fiber reinforced metals are desired for use in manufacturing the connectors.

Accordingly, there has been a continuous effort in this field of art to develop a means for producing a joint with the desired dimensional stability.

DISCLOSURE OF INVENTION

The present invention is directed towards dimensionally stable joints, especially joints between tubular members. The high dimensional stability of the joint is achieved by utilizing the isotropic/anisotropic properties of the manufacturing material for each structural element.

The tubular structural members have a near zero axial coefficient of thermal expansion (axial CTE) and a positive radial coefficient of thermal expansion (radial CTE). The connector elements have a very low positive radial CTE, and the radial CTE is substantially lower than the radial CTE of the tubular members and the clamping means. The annular clamping means have a radial CTE which is substantially the same as the radial CTE of the tubular structural members. Preferably the radial CTE of the clamps and tubular members are within $\pm 2 \times 10^{-6}$ in in$^{-1}$° F.$^{-1}$.

The high dimensional stability results from the tightening of the annular clamping means around the connectors and from the expansion and contraction of each element with respect to one another. Thus, the near zero axial CTE of the connectors and tubular members prevent axial distortion. The substantially equivalent radial CTE of the annular clamping means and tubular members plus the state of stress resulting from the tightening of the clamps prevent the tubular members from slipping out during cooling (thermal contraction) and from being deformed during heating (thermal expansion).

One aspect of the invention includes a dimensionally stable structural joint comprising at least two connector elements manufactured from a fiber reinforced glass matrix composite which, when mated, form a connector having at least two tubular sleeves. The connector is segmented along at least one plane parallel to the cylindrical cavity of each tubular sleeve, such that the connector is free to expand and contract in the radial direction. The joint further includes at least two tubular structural members manufactured from a material having a coefficient of axial expansion of substantially zero which are inserted into the sleeves of the connector. The tubular elements have a cylindrical cavity and the outside diameters are slightly smaller than the inside diameters of the sleeves. At least one annular clamping means is disposed around the outside surface of each sleeve in order to secure the tubular members within the sleeves.

Another aspect of the invention includes a dimensionally stable structural joint comprising of a connector element manufactured from a fiber reinforced composite. The connector has a plurality of axially oriented parallel slits in each tubular sleeve. The tubular structural members are manufactured from a material having an axial CTE of substantially zero. The tubular members have a cavity and the outside diameters are slightly smaller than the inside diameter of the sleeves. The tubular members are inserted into the connector sleeves. At least one annular clamping means is disposed around the outside surface of each sleeve in order to secure the tubular members within the sleeves.

Yet another aspect of the invention includes a method for assembling the above-recited dimensionally stable structural joints. The assembly of the joint comprising of the segmented connector consists of mating the connector elements to form a connector and one of the tubular structural members is inserted into one of the connector sleeves. At least one annular clamping means is disposed around the outside of the connector sleeve into which the tubular support member has been inserted and is tightened to secure the tubular support member inside of the connector sleeve and to develop a controlled stress in the joint. This procedure is repeated until all of the tubular support members have been inserted into connector sleeves and secured by annular clamping means. The assembly of the joint consisting of the slitted connector is essentially the same as the assembly of the segmented connector, except that the step to mate the segmented connector elements is eliminated, since the slitted connector consists of a single element.

The foregoing and other features and advantages of the present invention will become more apparent from the following description and drawings.

BRIEF DESCRIPTION OF DRAWINGS

FIG. 1 shows one possible configuration of connector elements which would form a connector having three tubular sleeves when mated.

FIG. 2 shows an assembled joint comprising three tubular structural members inserted into the sleeves of mated connector elements and secured by one annular clamping means per sleeve.

BEST MODE FOR CARRYING OUT THE INVENTION

Each dimensionally stable invention connector connects two or more tubular structural members. Each tubular structural member has at least one split annular clamping means disposed around the connector sleeve into which the tubular support member has been inserted. In order to maintain the constant tension necessary for the dimensional stability of the assembled structure the coefficient of thermal expansion of the manufacturing material of each structural member is considered.

The connector has a coefficient of thermal expansion of substantially zero in the axial direction, and a very low radial coefficient of thermal expansion. The tubular elements have an axial coefficient of $-1.0$ to $1 \times 10^{-6}$ in in$^{-1}$ °F.$^{-1}$ and a radial coefficient of thermal expansion of 8.0 to $14 \times 10^{-6}$ in in$^{-1}$ °F.$^{-1}$. The annular clamping means has essentially the same coefficient of thermal expansion as the tubular elements. Since the coefficient of thermal expansion of the tubular elements and the annular clamping means are essentially the same in the radial direction, the structure will expand and contract to the same extent over any given temperature range. Once the annular clamping means is tightened a constant state of stress exists independent of temperature. Thus, high dimensional stability results from the near zero axial CTE of the connectors and tubular elements, and the constant stress state which prevents damage to the tubular elements.

The class of materials which currently best meets the requirements for a dimensionally stable connector is fiber reinforced glass composites. This class includes chopped fiber reinforced glasses and glass ceramic composites. The preferred glass composites incorporate a reinforcing fiber having a modulus of 50 million psi to 120 million psi, such as the pitch derived HM ™ carbon fiber produced by Hercules, Inc. (Magna, UT), the P100 ™ carbon fiber produced by Amoco Performance Products, Inc. (Ridgefield, Conn.), or the Celion ® 6000 carbon fiber produced by Celanese Corporation (Chathem, N.J.).

Among the most preferred materials for this application are carbon fiber reinforced borosilicate glass and carbon fiber reinforced high silica content glass. The use of these matrices is disclosed in commonly owned U.S. Pat. No. 4,314,852 to Brennan et al., the disclosure of which is hereby incorporated by reference. The pertinent properties of two of these materials are summarized in Table 1. The borosilicate glass shown in Table 1 is Corning 7740 produced by Corning Glassworks (Corning, N.Y.), reinforced by 30 vol% to 35 vol% Celion ® carbon fibers. The high silica content glass shown in Table 1 is Corning 7913 reinforced by 20 vol% Celion ® carbon fibers.

TABLE 1

| Material | Coefficient of Expansion, $10^{-6}$ in in$^{-1}$ °F$^{-1}$ Axial | Thermal Radial | Density g/mc$^3$ | Fabricability | Stability in Space Environment |
|---|---|---|---|---|---|
| Carbon Fiber Reinforced Borosilicate Glass | 0.94 | 2.3 | 2.0 | Good | Good |
| Carbon Fiber Reinforced High Silica Glass | 0.17 | 0.72 | 2.0 | Good | Good |

As shown in Table 1, the fiber reinforced glass composites have very low coefficients of thermal expansion in the axial and radial directions (i.e. within the range of $\pm 1 \times 10^{-6}$ in in$^{-1}$ °F.$^{-1}$). In addition, these glass composites have low densities and are stable in the space environment. The glass composites also have a high degree of fabricability. They can be readily formed into the required complex shapes by several possible methods. Two such methods are described in commonly owned U.S. Pat. Nos. 4,428,763 to Layden and 4,464,192 to Layden et al., the disclosures of which are hereby incorporated by reference. The former patent describes a transfer molding process while the latter describes an injection molding process. Composites formed from a woven fiber preform may also be used.

Table 2 lists several other materials which have been considered for use in manufacturing structural member connectors. Most of these materials display disadvantages which limit their use in manufacturing structural connectors.

TABLE 2

| Material | Coefficient of Expansion, $10^{-6}$ in in$^{-1}$ °F.$^{-1}$ Axial | Thermal Radial | Density g/mc$^3$ | Fabricability | Stability in Space Environment |
|---|---|---|---|---|---|
| C/Al | ≈0 | 11–14 | 2.4 | Poor | Good |
| C/Mg | ≈0 | 11–14 | 2 | Poor | Good |
| Invar | 1 | 1 | 8 | Good | Good |
| C/Epoxy | ≈0 | 16 | 2 | Good | Poor |
| SiC/Al | 8–12 | 8–12 | 2.8 | Good | Good |
| B$_4$C/Mg | 8–12 | 8–12 | 2 | Good | Good |

As previously discussed, difficulties in controlling graphite fiber volume and fiber orientation prevent graphite/aluminum and graphite/magnesium from being readily manufactured into complex shapes. Invar, an iron/nickel alloy, is much too dense for use in space applications. Graphite epoxy degrades and erodes when exposed to atomic oxygen, and also it out-gasses in a space environment which could interfere with satellite optics. Particulate SiC/aluminum and particulate B$_4$C/magnesium have high coefficients of thermal expansion too high in the axial direction to be suitable for use as dimensionally stable structural connectors.

Each connector has at least two tubular sleeves into which structural members can be inserted. The connectors are split or segmented along at least one plane perpendicular to the cavity of each tubular sleeve, forming at least two elements. The segmentation or the slits of the connector permit the connector to accommodate the differences in radial expansion between the tubular members and connector elements. The segmented connector design also facilitates assembly of the support structure. FIG. 1 shows a connector comprising two elements, 10 and 12, with three tubular sleeves, 14, 16, and 18.

The tubular structural members form the framework of the structural element when held together by the connectors. In order to maintain the dimensional stability of the assembled structure, the structural members should have a coefficient of axial expansion of essentially zero. In addition, the structural members should have a low density and be stable in the space environment.

The preferred class of materials for use as structural members is continuous graphite fiber reinforced metals, which preferably have coefficients of axial expansion of between approximately $-1.0$ in in$^{-1}$° F.$^{-1}$ to approximately $1 \times 10^{-6}$ in in$^{-1}$° F.$^{-1}$. Among the most preferred materials for this application are graphite/aluminum and graphite/magnesium. Tubes suitable for use as structural members may be purchased from DWA Composite Specialties, Inc. (Chatsworth, Calif.) or Material Concepts, Inc. (Columbus, Ohio). As shown in FIG. 2, the tubular structural members, 20, 22, and 24, are inserted into connector sleeves 14, 16, and 18.

The tubular structural members are secured inside the connector sleeves by at least one annular clamping means per sleeve. In order to accommodate thermal expansion and contraction in the radial direction, the annular clamps are manufactured from a material which have a coefficient of radial expansion similar to that of the tubular structural members. For example, aluminum alloys, particulate SiC/Aluminum, particulate SiC/Aluminum alloys, magnesium alloys, particulate B$_4$C/Magnesium, and particulate B$_4$C/Magnesium alloys are satisfactory materials for use in manufacturing the annular clamps. The annular clamps may be manufactured by conventional machining techniques such as forging or rolling and may be subsequently machined to final shape. The annular clamps, shown as 26, 28, and 30 in FIG. 2, are disposed around the outside surfaces of the sleeves, 14, 16, and 18, and are tightened to provide the compression necessary to secure the tubular structural members, 20, 22, and 24, within the connector sleeves.

The segmented structural joint may be assembled in several different ways. One method is to mate the connector elements to form a connector and then insert a tubular structural member into one of the connector sleeves. At least one annular clamping means is disposed around the sleeve and is tightened to secure the structural member within the sleeve. Although the assembly method has been claimed in this fashion, a person skilled in the art would realize that other assembly methods may be equally effective. For example, a structural member may be placed in the sleeve portion of a connector element before the elements are mated to form the connector. The slitted structural joint may be assembled by inserting the tubular structural members into one of the connector sleeves. At least one annular clamping means is disposed around the sleeve and is tightened to secure the structural member within the sleeve.

Structural joints such as the ones disclosed in this specification display the strength and axial dimensional stability necessary for use in space structures. The glass composites used for the connector and fiber reinforced metals used for the structural members give the joint the desired dimensional stability. The combination of the segmented connector or slitted connector and the annular clamping means manufactured from a material having substantially the same coefficient of thermal expansion in the radial direction as the tubular structural members permits the use of these different materials for the connector and for the structural members. The net result is a joint which displays substantial dimensional stability in the axial direction while accommodating expansion and contraction in the radial direction.

Although this invention has been shown and described with respect to detailed embodiments thereof, it will be understood by those skilled in the art that various changes in form and detail thereof may be made without departing from the spirit and scope of the claimed invention.

We claim:
1. A dimensionally stable structural joint comprising:
   (a) a connector having at least two tubular sleeves, each of said sleeves having a cylindrical cavity and inside and outside surfaces, said connector segmented parallel to the cylindrical cavity of the sleeves, said connector elements manufactured from a material with an axial coefficient of thermal expansion of approximately $-1.0$ to $1.0 \times 10^{-6}$ in in$^{-1}$° F.$^{-1}$;
   (b) at least two tubular structural members manufactured from a material having an axial coefficient thermal expansion of approximately $-1.0$ to $1.0 \times 10^{-6}$ in in$^{-1}$° F.$^{-1}$ and a positive radial coefficient of thermal expansion of 8.0 to $14.0 \times 10^{-6}$ in in$^{-1}$° F.$^{-1}$ which are inserted into said sleeves of said connector; and
   (c) at least one annular clamping means per sleeve which has substantially the same coefficient of radial expansion as the tubular structural members, and is disposed around the outside surfaces of the sleeves to secure said tubular structural members within said sleeves,
whereby high dimensional stability results from the tightening of the clamping means which provide a constant state of stress, over a given temperature range, which is sufficient to secure said tubular members upon thermal contraction and insufficient to deform said tubular members upon thermal expansion and from the essentially equivalent radial expansion of said tubular structural members and said annular clamping means, and essentially zero axial expansion of said tubular structural members and said connector.

2. The dimensionally stable structural joint of claim 1 wherein the connector elements comprise carbon fiber reinforced borosilicate glass.

3. The dimensionally stable structural joint of claim 1 wherein the connector elements comprise carbon fiber reinforced high silica content glass.

4. The dimensionally stable structural joint of claim 1 wherein the tubular structural members comprise continuous graphite fiber reinforced metal.

5. The dimensionally stable structural joint of claim 4 wherein the tubular structural members comprise continuous graphite fiber reinforced aluminum.

6. The dimensionally stable structural joint of claim 4 wherein the tubular structural members comprise continuous graphite fiber reinforced magnesium.

7. The dimensionally stable structural joint of claim 1 wherein the annular clamping means comprise aluminum alloys particulate SiC/Aluminum or particulate SiC/Aluminum alloys.

8. The dimensionally stable structural joint of claim 1 wherein the annular clamping means comprise magnesium alloys particulate $B_4C$/Magnesium or particulate $B_4C$/Magnesium alloys.

9. The dimensionally stable structural joint of claim 1 wherein the radial coefficient of thermal expansion of said annular clamping means is $\pm 2.0 \times 10^{-6}$ in $in^{-1}$ $F.^{-1}$ of the radial coefficient of thermal expansion of said tubular structural members.

10. A dimensionally stable structural joint comprising:
(a) a connector having at least two tubular sleeves, each of said sleeves having a cylindrical cavity and inside and outside surfaces, and said connector having a plurality of slits parallel to the cylindrical cavity of said sleeves, said connector elements manufactured from a material with an axial coefficient of thermal expansion of approximately $-1.0$ to $1.0 \times 10^{-6}$ in $in^{-1\circ}$ $F.^{-1}$,
(b) at least two tubular structural members manufactured from a material having an axial coefficient thermal expansion of approximately $-1.0$ to $1.0 \times 10^{-6}$ in $in^{1\circ}$ $F.^{-1}$ and a positive radial coefficient of thermal expansion of 8.0 to $14.0 \times 10^{-6}$ in $in^{-1\circ}$ $F.^{-1}$ which are inserted into said sleeves of said connector; and
(c) at least one annular clamping means per sleeve which has substantially the same coefficient of radial expansion as the tubular structural members, and is disposed around the outside surfaces of the sleeves to secure said tubular structural members within said sleeves, whereby high dimensional stability results from the tightening of the clamping means which provide a constant state of stress, over a given temperature range, which is sufficient to secure said tubular members upon thermal contraction and insufficient to deform said tubular members upon thermal expansion, and from the essentially equivalent radial expansion of said tubular structural members and said annular clamping means, and essentially zero axial expansion of said tubular structural members and said connector.

11. A method of assembling a dimensionally stable structure comprising:
(a) mating at least two connector elements to form a connector having at least two tubular sleeves said sleeves having a cavity and inside and outside surfaces and said connector segmented parallel to the cylindrical cavity of the sleeves such that the connector is free to expand and contract in the radial direction, said connector elements manufactured with a fiber reinforced glass composite with an axial coefficient of thermal expansion of $-1.0$ to $1.0 \times 10^{-6}$ in $in^{-1\circ}$ $F.^{-1}$;
(b) inserting at least two tubular structural members manufactured from a material having an axial coefficient of thermal expansion of substantially zero into said sleeves of said connector; and
(c) disposing and tightening at least one annular clamping means having substantially the same coefficient of radial expansion as the tubular structural members around the outside surfaces of each sleeves, thereby securing said tubular structural members within said sleeves, whereby, high dimensional stability results from the tightening of the clamping means which provide a constant state of stress, over a given temperature range, which is sufficient to secure said tubular structural member upon thermal contraction but insufficient to deform them upon thermal expansion, and from the essentially equivalent radial expansion of said tubular structural members and said annular clamping means, and essentially zero axial expansion of said tubular structural members and said connector.

* * * * *